United States Patent [19]

Mikkor

[11] Patent Number: 4,826,131

[45] Date of Patent: May 2, 1989

[54] ELECTRICALLY CONTROLLABLE VALVE ETCHED FROM SILICON SUBSTRATES

[75] Inventor: Mati Mikkor, Ann Arbor, Mich.

[73] Assignee: Ford Motor Company, Dearborn, Mich.

[21] Appl. No.: 234,707

[22] Filed: Aug. 22, 1988

[51] Int. Cl.[4] .................. F16K 7/14; F16K 31/08
[52] U.S. Cl. .................. 251/129.17; 251/65; 251/129.07; 251/368; 239/585
[58] Field of Search .............. 251/129.17, 65, 368; 239/585

[56] References Cited

U.S. PATENT DOCUMENTS 4,585,209  4/1986  Aine et al. .
4,628,576  12/1986  Giachino et al. .
4,647,013  3/1987  Giachino et al. .

FOREIGN PATENT DOCUMENTS 3621332  1/1988  Fed. Rep. of Germany ........ 251/65

Primary Examiner—Arnold Rosenthal
Attorney, Agent, or Firm—Allan J. Lippa; Peter Abolins

[57] ABSTRACT

An electrically controllable valve etched from two silicon substrates includes an inlet orifice communicating with two outlet orifices through a channel etched into the substrates. A mesa, in operative alignment with the inlet orifice, is suspended between the channel and a sealed recess by a diaphragm. The mesa has a permanent magnet attached thereto in operative alignment with a flat helical coil deposited on another substrate which seals the recess. Electronic control circuitry passes current through the coil in an appropriate direction to deflect the mesa in a corresponding direction for either opening or closing the valve. Equalized pressure is maintained on opposing mesa surfaces by a passageway communicating between the sealed recess and an outer surface of the valve thereby minimizing the force required to operate the valve.

13 Claims, 5 Drawing Sheets

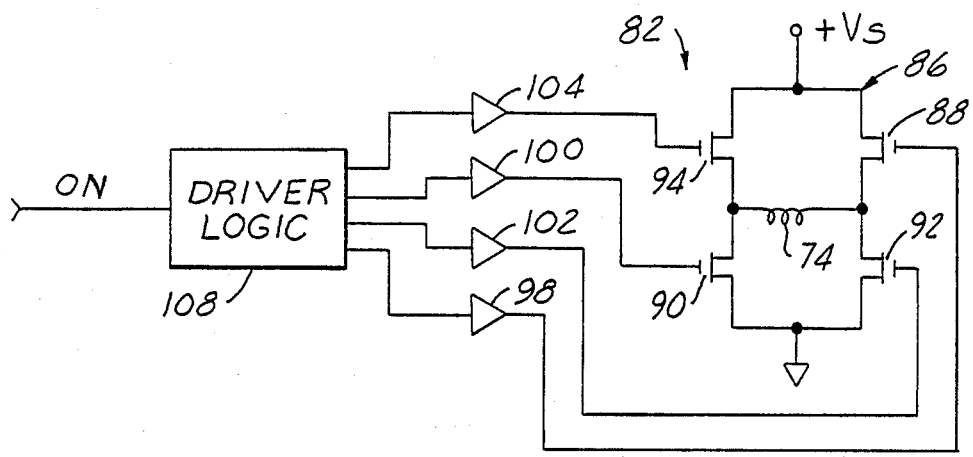
FIG.4
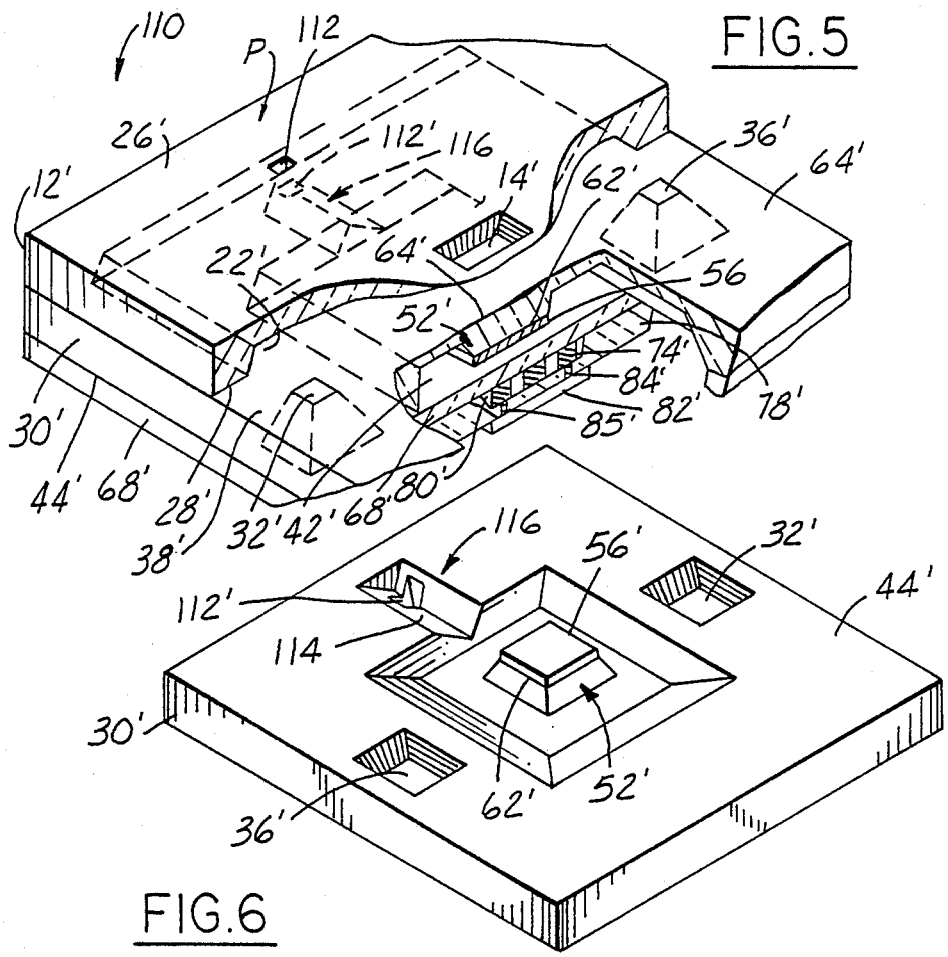
FIG.5
FIG.6

ELECTRICALLY CONTROLLABLE VALVE ETCHED FROM SILICON SUBSTRATES

BACKGROUND OF THE INVENTION

The present invention relates to fluid control valves etched from monocrystalline substrates such as silicon.

It is known to etch nozzles, such as ink jet nozzles, from silicon substrates utilizing batch processing techniques found in the semiconductor industry. Precision components comparable to precision machined metal components have been achieved without the complexity and labor intensity of metal machining processes. More compact and reliable nozzles have resulted.

Attempts have also been made to replace machined control valves with semiconductor devices. For example, U.S. Pat. No. 4,585,209 to Aine et al discloses a gas valve for controlling the flow of gaseous material. A silicon cantilevered leaf spring is disposed overlying an apertured plate. The cantilever is electrically isolated from the valve plate by a coating of thin insulating material applied over the valve plate. Gas pressure applied against the cantilever opens the valve by bending the cantilever. An electrostatic potential applied between the cantilever and plate bends the cantilever back over the plate to reduce or shut off the gaseous flow. A disadvantage of this approach is that the pressure force applied by the gas must be overcome by the combination of cantilever spring force and electrostatic attraction in order to seal the valve. Thus, this apparatus does not appear to be suitable for controlling fluids under higher pressures such as, for example, the fluid pressures in which automobile fuel injectors must operate. Still another disadvantage, is the potential for electrical arcing between the valve plate and cantilever which would be unacceptable in applications utilizing flammable fluids. Another disadvantage is that at low fluid pressures, there may be insufficient gas pressure to overcome the stiffness of the cantilever thereby preventing actuation of the valve.

An approach using silicon valves wherein pressurized fuels are controlled is disclosed in U.S. Pat. Nos. 4,628,576 and 4,647,013, both issued to Giachino et al. However, this approach requires mechanical springs, or equivalent structures, for seating the valve. More specifically, an etched substrate having a diaphragm and downward facing mesa is shown positioned over a substrate having a nozzle in alignment with the mesa. The substrates are etched such that fluid enters from the sides and exits through the outlet nozzle. A piezoelectric wafer is bonded to the top of the diaphragm. Attached to the top of the wafer is a coil return spring. A smaller spring disposed under the outlet nozzle pushes the lower substrate against the mesa for sealing the valve during the off state. In operation, the piezoelectric wafer pushes against the coil spring to lift the mesa away from the outlet orifice in response to the application of electrical power. When electrical power is removed, the wafer relaxes, enabling the return spring to downwardly deflect the mesa against the outlet orifice. A disadvantage of this approach is its size and complexity, requiring two mechanical springs and a piezoelectric wafer of sufficient size to overcome the force of the mechanical return spring.

SUMMARY OF THE INVENTION

An object of the present invention is to provide an electrically controllable valve suitable for use with pressurized fuels which may be totally fabricated by semiconductor batch processing techniques.

The above problems and disadvantages are overcome, and object achieved, by the electrically controlled valve etched from silicon substrates for controlling fluid flow from a pressurized source, as described herein. In one particular aspect of the invention, the valve comprises: a first silicon substrate having an inlet orifice etched therethrough; a second silicon substrate having at least one outlet orifice etched therethrough, the second substrate also having an obverse surface coupled to the first substrate to define a channel communicating between the inlet orifice and the outlet orifice; a recess etched into the reverse surface of the second substrate to define a diaphragm between the recess and the channel; a mesa coupled to the diaphragm having an obverse surface in operative alignment with the inlet orifice and also having a reverse surface; a permanent magnet coupled to the reverse surface of the mesa; a third substrate bonded to the reverse surface of the second substrate for sealing the recess; a passage communicating between the pressurized source of fluid and the recess; an electrically conductive coil bonded to the third substrate in alignment with the permanent magnet; and means for applying a dc current to the coil in a direction to move the mesa against the inlet orifice and for applying a dc current to the coil in a direction to move the mesa away from the inlet orifice.

Since the passage communicates between the pressurized source of fluid and the recess, equalized pressure is maintained on both sides of the mesa. An advantage is thereby obtained because the valve does not have to overcome fluid pressure when either opening or closing. Accordingly, mechanical return springs, such as coil springs, are not needed thereby providing a more compact valve assembly which requires fewer assembly steps. Another advantage is that the attraction and repulsion between both coil and permanent magnet operates to both close and open the valve rather than being constrained to operate in only one direction as typical of prior approaches. Thus, the invention is also able to operate at low fluid pressures.

The invention will be better understood and further objects and advantages thereof will become more apparent from the following descriptive example, entitled Description of Preferred Embodiment, with reference to the following drawings.

BRIEF DESCRIPTION OF THE DRAWINGS

FIG. 4 is an electrical schematic of a circuit for controlling a valve assembly such as valve assembly 10;

FIG. 5 is a partially broken-away perspective view of an alternate embodiment in which the invention is used to advantage, the embodiment shown in this example is valve assembly 110;

FIG. 6 is a bottom view of a portion of the embodiment shown in FIG. 5;

DESCRIPTION OF PREFERRED EMBODIMENT

Figure 1:
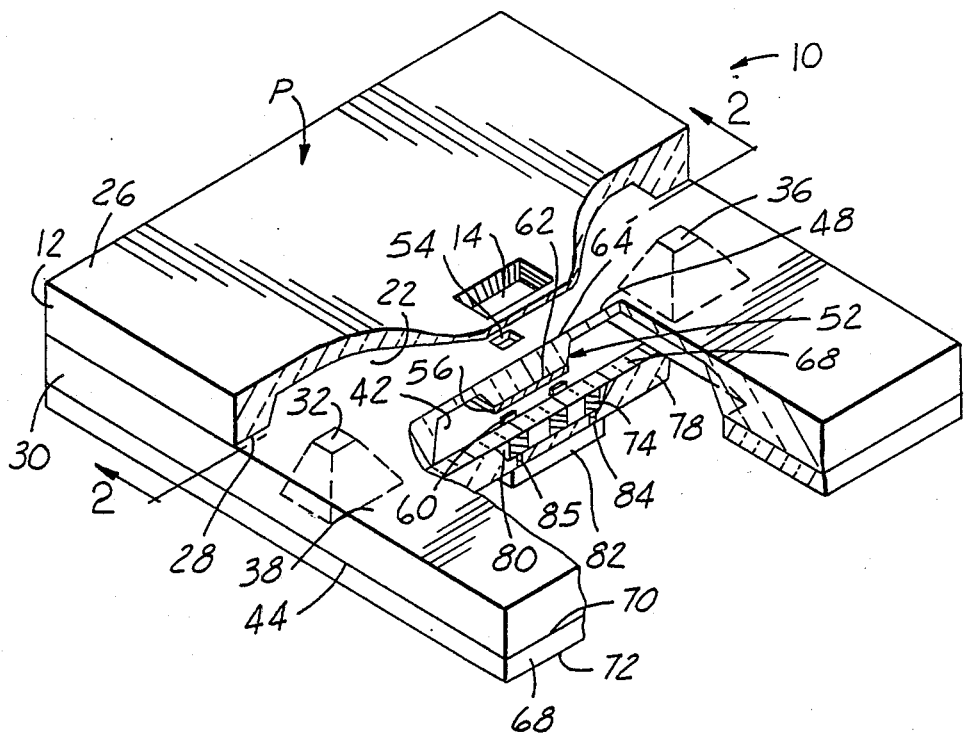
FIG. 1 is a partially broken-away perspective view of an embodiment in which the invention is used to advantage, the embodiment shown in this example is valve assembly 10.
Figure 2A:
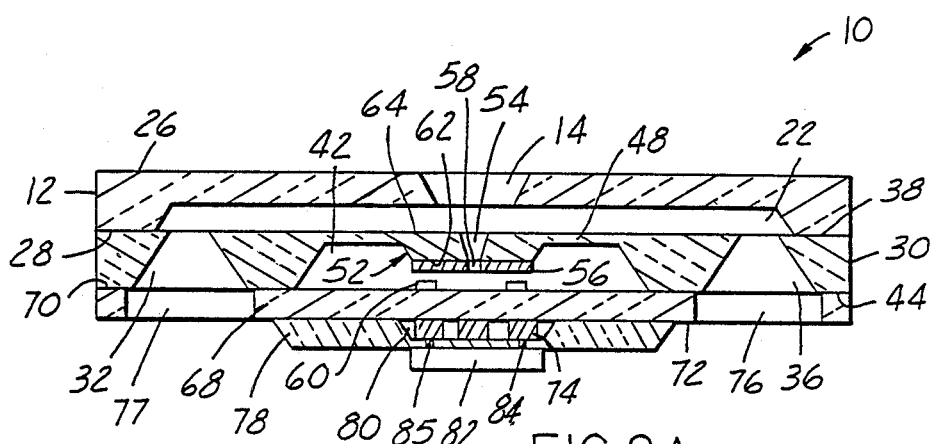
FIG. 2A is a cross-sectional view of valve assembly 10 taken along line 2—2 of FIG. 1.

Silicon valve assembly 10 is shown in the perspective view of FIG. 1, and cross-sectional view of FIG. 2A taken along line 2—2 of FIG. 1. Valve assembly 10 includes substrate 12, a {100} silicon wafer in this example, having a single inlet orifice 14 etched therethrough by conventional photolithographic and anisotropic etching techniques. Substrate 12 is also shown having interior channel 22 etched into reverse surface 28. For the example shown, an anisotropic etchant such as aqueous solution of postassium hydroxide is used wherein the side walls of all etched structures, such as inlet orifice 14, lie in the {111} planes. Valve assembly 10 is configured for positioning in a fluid channel, such as fuel injector body 18 (FIG. 11) of fuel injector 20, wherein top or obverse surface 26 of substrate 12 and inlet orifice 14 are exposed to a pressurized fluid, gasoline in this example.

Valve assembly 10 is also shown including lower substrate 30, {100} silicon in this example, having outlet orifice 32 and outlet orifice 36 etched therethrough. It is noted that any number of outlet orifices desired may be etched in the same etching step for any fluid spray pattern desired without an increase in the fabricating complexity of valve assembly 10. Obverse surface 38 of substrate 30 is bonded by conventional bonding techniques to reverse surface 28 of substrate 12 such that channel 22 communicates with inlet orifice 14 and outlet orifices 32 and 36. In this example, silicon fusion bonding is preferred wherein silicon wafer surfaces 28 and 38 are hydrated with boiling $HNO_3$. Wafers 12 and 30 are then pressed together and heated to about 1000° C., yielding a hermetic silicon/silicon bond with no intervening layer. Another example of a bonding technique is to utilize anodic bonding by sputtering surface 28 with a layer of PYREX TM or 7740 Corning Glass having a coefficient of thermal expansion approximating that of silicon. Preferably, the layer of glass is approximately 50–100 μm thick. A hermetic seal is then made by heating the surfaces 28 and 38 to 400°–500° C. and applying a negative potential to the glass of 20–500 volts.

Figure 3:
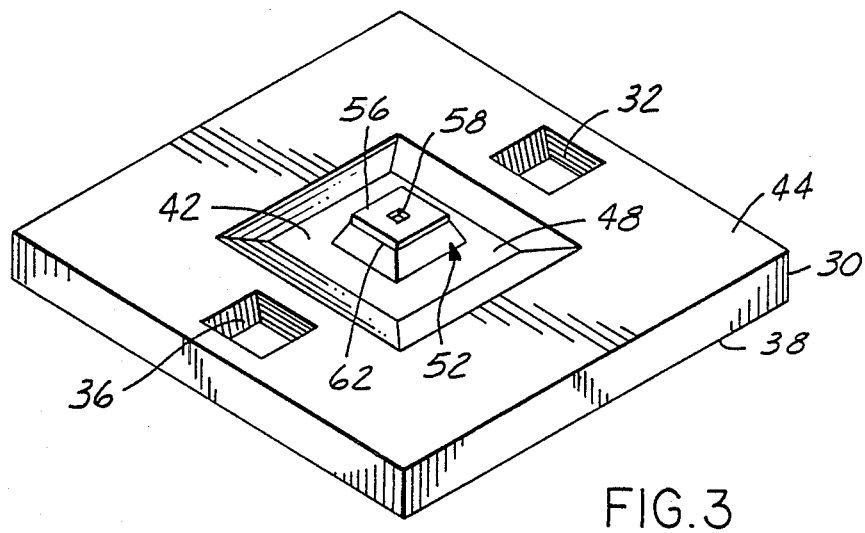
FIG. 3 is a bottom view of a portion of the embodiment shown in FIG. 1.

Continuing with FIGS. 1 and 2A, and also referring to the bottom view of substrate 30 shown in FIG. 3, recess 42 is anisotropically etched into obverse surface 44 of substrate 30 to define diaphragm 48 and downwardly extending mesa 52. Thin permanent magnet 56, rare earth magnet of the NdFeB type having a thickness of 0.010–0.020 inches in this example, is shown attached to reverse surface 62 of mesa 52. Magnet 56 is also shown having hole 58 formed therethrough for alignment with passage 54.

Figure 2B:
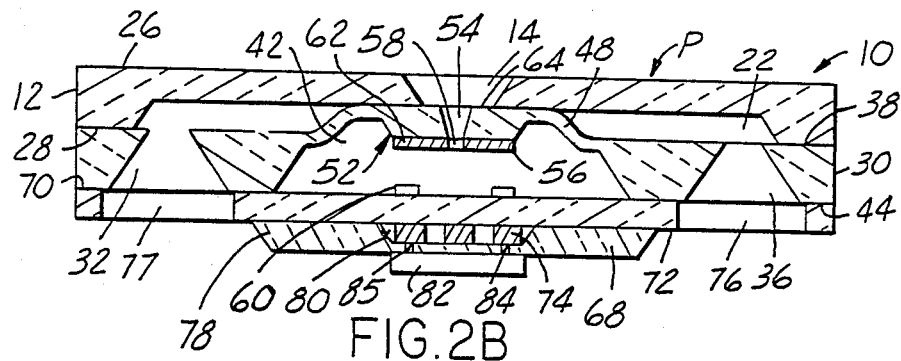
FIG. 2B is a cross-sectional view of valve assembly 10 illustrated in the off position.
Figure 2C:
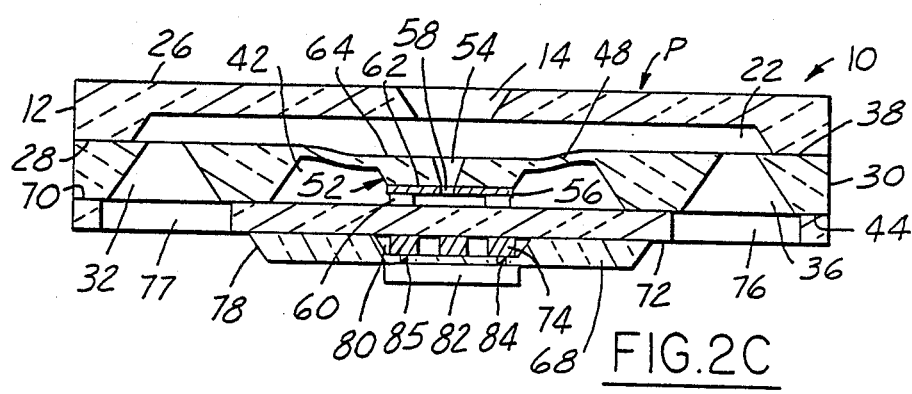
FIG. 2C is a cross-section view of valve assembly 10 illustrated in the ON position.

As described in greater detail hereinafter, when mesa 52 is pushed upwardly against inlet orifice 14, passage 54 communicates between inlet orifice 14 and recess 42 such that fluid pressure P is maintained on both reverse surface 62 and obverse surface 64 of mesa 52. This condition is shown in FIG. 2B as the off position of valve assembly 10. And, when mesa 52 is pulled downwardly against tabs 60, passage 54 communicates between channel 22 and recess 42 such that pressure P is again maintained on both reverse surface 62 and obverse surface 64 of mesa 52. This condition is shown in FIG. 2C as the on position of valve assembly 10.

Continuing with FIGS. 1 and 2A, third substrate 68, a glass substrate in this example, is shown having obverse 70 bonded to reverse surface 44 of substrate 30 for sealing recess 42. Slots 76 and 77 are shown formed in substrate 68 for alignment with respective outlet orifices 36 and 32. Anodic bonding, similar to that described above, is used to advantage for bonding substrates 30 and 68 because the lower temperatures of anodic bonding as compared to fusion bonding will not demagnetize permanent magnet 56. Helical planar coil 74 is shown bonded to reverse surface 72 of substrate 68 in alignment with magnet 56. Coil 74 is formed by vacuum evaporation of a layer of chromium, 1000–1500 angstroms in thickness, on reverse surface 72. Conventional photolithographic techniques are then used to delineate the helical shape. Additional coil thickness is obtained by conventional electrochemical plating. Coil 74 is also shown sealed by bonding a fourth substrate 78, {100} silicon in this example, having cavity 80 anistropically etched therein, to substrate 68 by anodic bonding.

Figure 11:
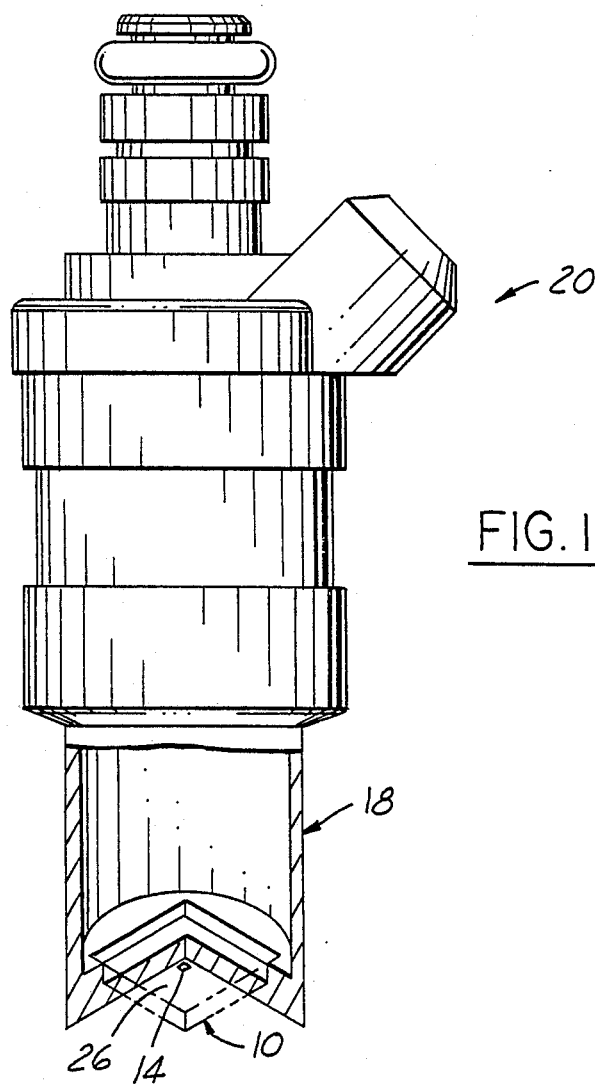
FIG. 11 is a partially broken-away perspective view of a fuel injector which may be used to advantage with either valve assembly 10, 110, 130, or any other valve assembly constructed in accordance with the teachings of the invention herein.

Referring to FIG. 4, electrical circuit 82 is shown coupled to coil 74 for providing current and switching the current direction through coil 74. Circuit 82 is shown in this example as an H bridge circuit mounted on substrate 78 and connected to coil 74 via plated through holes 84 and 85 (FIG. 2A). Coil 74 is schematically shown connected in H bridge circuit 86 which comprises field effect transistors (FET) 88, 90, 92, and 94. H bridge circuit 86 is shown connected between voltage supply $V_s$ and a conventional signal return. The gates of FET's 88, 90, 92, and 94 are shown respectively coupled to power drivers 98, 100, 102, and 104. Driver logic 108, conventional decode gating in this example, actuates drivers 98 and 100 in response to an ON command signal thereby directing current through FET 88, coil 74, and FET 90 to the signal return. When the ON command signal is not present, driver logic 108 actuates drivers 102 and 104 thereby directing current through FET 94, coil 74, and FET 92 to the signal return. The ON command signal is provided by a conventional fuel controller (not shown) for actuating valve assembly 10 positioned in fuel injector 20 (FIG. 11).

In operation, current is passed through coil 74 in the forward direction in response to the ON command signal. Magnet 56 is thereby attracted to coil 74, downwardly attracting mesa 52 for placing valve assembly 10 in the ON position as illustrated in FIG. 2C. When the ON command signal is not present, current passes through coil 74 in the reverse direction. Magnet 56 is then repelled from coil 74, upwardly deflecting mesa 52 against inlet orifice 14 for placing valve assembly 10 in off position as shown in FIG. 2B.

It is noted that since fluid pressure P is maintained on both opposing surfaces 62 and 64 of mesa 52, as previously described herein, the force required to open or close valve assembly 10 need only deflect diaphragm 48. This is an advantage over prior approaches wherein the applied force had to deflect the diaphragm (or other movable structure), overcome the fluid pressure force P, and also overcome a mechanical return spring force.

An alternate embodiment is now described with reference to FIGS. 5 and 6 wherein like numerals refer to like parts shown in respective FIGS. 1 and 3. This alternate embodiment provides an alternate passage (116) for maintaining fluid pressure P on both surfaces 62' and 64' of mesa 52'. Hole 112 is shown anistropically etched through substrate 12'. Groove 114 is shown etched into reverse surface 44' of substrate 30' and intersecting hole 112 to define passage 116. Hole 112 is offset from both passage 22' and recess 42' such that it does not intersect either passage 22' or recess 42'. Glass substrate 68' is bonded to reverse surface 44' of substrate 30' for sealing recess 42' such that recess 42' communicates only with obverse surface 26' of substrate 12' through passage 116. Thus, in a manner similar to that described herein with respect to passage 54, passage 116 enables fluid pressure P to act concurrently on both opposing surfaces 62 and 64 of mesa 52. The operation and advantages of the alternate embodiment shown in FIGS. 5 and 6 are substantially similar to those previously described herein with particular reference to the embodiment shown in FIGS. 1 through 3.

Figure 7:
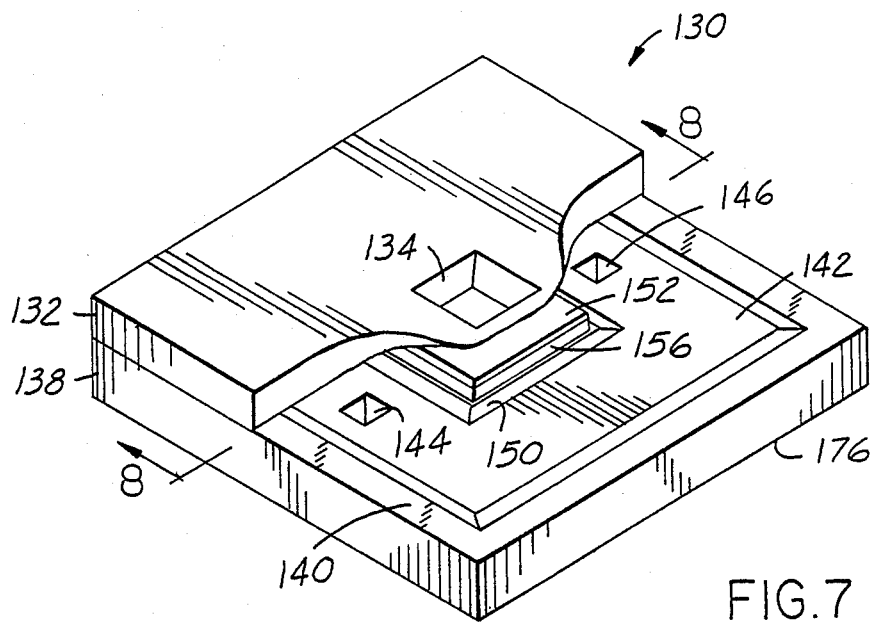
FIG. 7 is a partially broken-away perspective view of another alternate embodiment in which the invention is used to advantage, the embodiment shown in this example is valve assembly 130.
Figure 8:
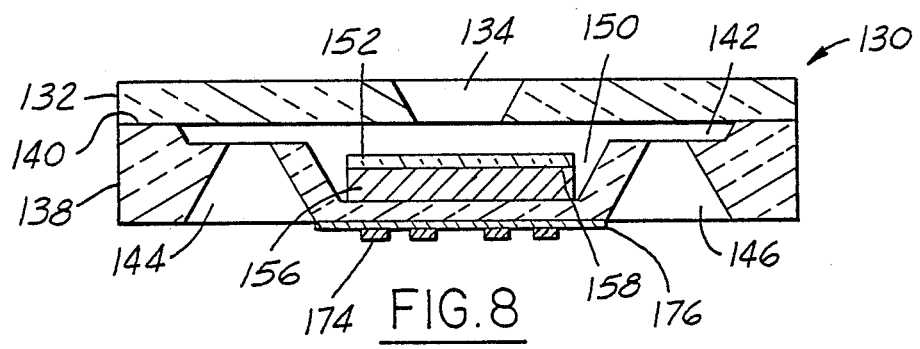
FIG. 8 is a cross-sectional view taken along line 8—8 of FIG. 7.
Figure 9:
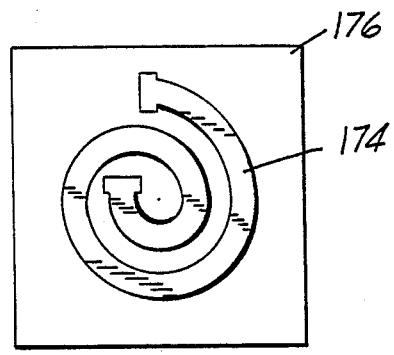
FIG. 9 is a bottom view of a portion of the embodiment shown in FIG. 7.

Still another alternate embodiment is shown in the perspective view of FIG. 7 and corresponding cross-sectional view of FIG. 8 taken along line 8—8 of FIG. 7. Upper substrate 132, {100} silicon in this example, is shown having inlet orifice 134 anisotropically etched therethrough. Lower substrate 138 is shown having obverse surface 140 with a recess etched therein to define channel 142. Outlet orifices 144 and 146 are shown etched from channel 142 through substrate 138. Substrate 132 is bonded to obverse surface 140 of substrate 138 by anodic bonding similar to that previously described herein such that channel 142 communicates between inlet orifice 134 and outlet orifices 144 and 146. Cavity 150 is shown etched from channel 142 into substrate 138 for receiving planar element 152. Cavity 150 and planar element 152 are shown in alignment with inlet orifice 134. Permanent magnet 156, having properties substantially similar to permanent magnet 56 described previously herein with particular reference to FIGS. 1-3, is shown bonded to reverse surface 158 of planar element 152. Coil 174, having properties substantially similar to coil 74 described previously herein, is shown bonded to insulating layer 176, silicon oxide grown on reverse surface 178 by conventional techniques. A bottom view of coil 174 is also shown in FIG. 9. Electronic circuitry 82 (FIG. 4) is coupled to coil 174 for providing current to coil 174 in a direction dependent upon the ON signal as previously described herein.

In operation, with current supplied to coil 174 in response to the ON signal, planar element 152 is attracted to coil 174 thereby opening inlet orifice 134. Fluid then flows from inlet orifice 134, through channel 142, and outlet orifices 144 and 146. When the ON signal is not present, current flows through coil 174 in the reverse direction thereby repelling planar element 152 from coil 174 against substrate 132 sealing off inlet orifice 134.

Figure 10:
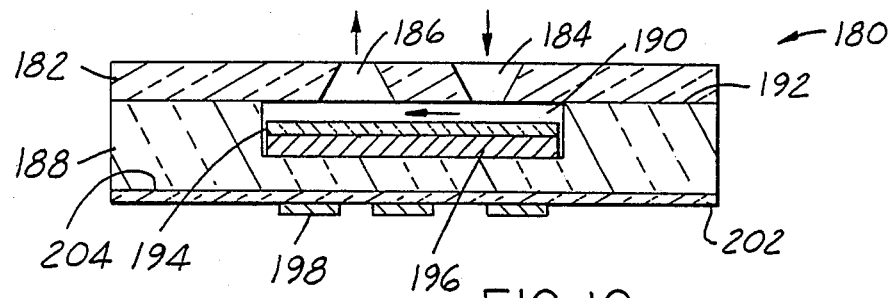
FIG. 10 is a cross-sectional view of still another alternate embodiment in which the invention is used to advantage, the embodiment shown in this example is valve assembly 180.

Still another alternate embodiment is shown in FIG. 10 as a cross-sectional view of valve assembly 180. Upper substrate 182, {100} silicon in this example, is shown having both inlet nozzle 184 and outlet nozzle 186 etched therethrough. Lower substrate 188 is shown having cavity or channel 190 etched into obverse surface 192 of substrate 188. Upper substrate 182 is shown bonded to obverse surface 192 such that channel 190 communicates between inlet orifice 184 and outlet orifice 186. Planar element 192 is shown freely positioned in cavity 190. Permanent magnet 196, having properties similar to permanent magnet 54 described previously herein with particular reference to FIGS. 1-3, is shown bonded to planar element 192. Coil 198 is shown bonded to insulating layer 202, a layer of silicon oxide grown on reverse surface 204 of substrate 188. The material construction and manner of bonding coil 198 are similar to those previously described herein with particular reference to coil 174. Electrical circuit 82 is coupled to coil 198 for repelling element 194 against substrate 182 hereby turning off valve assembly 180, and for attracting element 194 to coil 198 thereby turning on valve assembly 180.

It is noted that valve assembly 180, having inlet and outlet orifices on the same planar surface, is not suitable for use with fuel injector 20. Either valve assembly 10, 110, or 130, or other valve assemblies constructed in accordance with the teachings of the invention herein, may be used to advantage with fuel injector 20. Since these valves do not require the mechanical return springs and/or piezoelectric elements of prior approaches, the size of fuel injector 20 may be considerably decreased thereby providing still another advantage of the invention described herein.

This concludes the description of the preferred embodiment. The reading of it by those skilled in the art will bring to mind many alterations and modifications without departing from the spirit and scope of the invention. Accordingly, it is intended that the scope of the invention be limited only by the following claims.

What is claimed is:

1. An electrically controllable valve etched from silicon substrates, comprising:
   a first silicon substrate having an inlet orifice etched therethrough;
   a second silicon substrate having at least one outlet orifice etched therethrough, said second substrate also having an obverse surface bonded to said first substrate to define a channel communicating between said inlet orifice and said outlet orifice;
   a recess etched into said obverse surface of said second substrate in alignment with said inlet orifice;
   a planar element positioned in said recess having an obverse surface in operative alignment with said inlet orifice;
   a permanent magnet attached to said planar element;
   an electrically conductive coil coupled to said reverse surface of said second substrate in operative alignment with said permanent magnet; and
   means for applying a dc current to said coil in a direction to move said planar element against said inlet orifice and for applying a dc current to said coil in a direction to move said planar element away from said inlet orifice.

2. The valve recited in claim 1 wherein said channel is further defined by a cavity etched in said obverse surface of said second substrate.

3. The valve recited in claim 1 wherein said channel is further defined by a cavity etched into said first silicon substrate.

4. An electrically controllable valve etched from silicon substrates for controlling fluid flow from a pressurized source, comprising:
   a first silicon substrate having an inlet orifice etched therethrough;
   a second silicon substrate having at least one outlet orifice etched therethrough, said second substrate also having an obverse surface coupled to said first substrate to define a channel communicating between said inlet orifice and said outlet orifice;
   a recess etched into said reverse surface of said second substrate to define a diaphragm between said recess and said channel;
   a mesa coupled to said diaphragm having an obverse surface in operative alignment with said inlet orifice and also having a reverse surface;
   a permanent magnet coupled to said reverse surface of said mesa;
   a third substrate bonded to said reverse surface of said second substrate for sealing said recess;
   a passage communicating between the pressurized source of fluid and said recess;
   an electrically conductive coil bonded to said third substrate in alignment with said permanent magnet; and
   means for applying a dc current to said coil in a direction to move said mesa against said inlet orifce and for applying a dc current to said coil in a direction to move said mesa away from said inlet orifice.

5. The valve recited in claim 4 wherein said channel is further defined by a passage extending through said first and second substrates.

6. The valve recited in claim 5 wherein said passage extends through said mesa.

7. The valve recited in claim 4 wherein said means for applying a dc current comprises four switching transistors interconnected in an H bridge between a voltage source and a voltage return.

8. The valve recited in claim 4 wherein said third substrate is comprised of glass.

9. The valve recited in claim 4 wherein said coil is comprised of a flat helical conductive metal bonded to said third substrate.

10. An electrically controllable fuel injector valve for controlling the fuel flow from a pressurized source, comprising:
    a fuel injector body coupled to the pressurized source of fuel;
    a first silicon substrate positioned in said fuel injector body having an obverse surface communicating with the pressurized source of fuel, a channel etched into a reverse surface of said first substrate, and an inlet orifice etched through said obverse surface of said first substrate and said channel;
    a second silicon substrate having at least one outlet orifice etched therethrough, said second substrate having an obverse surface bonded to said reverse surface of said second substrate such that said channel communicates between said inlet and outlet orifices;
    a recess etched into said reverse surface of said second substrate to define a diaphragm between said recess and said channel;
    a mesa coupled to said diaphragm having an obverse surface in operative alignment with said inlet orifice and also having a reverse surface;
    a permanent magnet coupled to said reverse surface of said mesa;
    third substrate bonded to said reverse surface of said second substrate for sealing said recess;
    a passage communicating between the pressurized source of fluid and said recess;
    an electrically conductive coil bonded to said third substrate in alignment with said permanent magnet; and
    means for applying a dc current to said coil in a direction to move said mesa against said inlet orifice and for applying a dc current to said coil in a direction to move said mesa away from said inlet orifice.

11. The fuel injector valve recited in claim 10 wherein said means for applying a dc current comprises four switching transistors interconnected in an H bridge between a voltage source and a voltage return.

12. The fuel injector valve recited in claim 10 wherein said third substrate is comprised of glass.

13. The fuel injector valve recited in claim 10 wherein said coil is comprised of a flat helical conductive metal bonded to said third substrate.

* * * * *